United States Patent [19]

Hiroi

[11] Patent Number: 5,535,117
[45] Date of Patent: Jul. 9, 1996

[54] METHOD AND APPARATUS FOR CONTROLLING A PROCESS HAVING A CONTROL LOOP USING FEEDBACK CONTROL

[75] Inventor: Kazuo Hiroi, Tokyo, Japan

[73] Assignee: Kabushiki Kaisha Toshiba, Kawasaki, Japan

[21] Appl. No.: 215,576

[22] Filed: Mar. 22, 1994

[30] Foreign Application Priority Data

Mar. 22, 1993 [JP] Japan .................... 5-062158

[51] Int. Cl.$^6$ .................................... G05B 13/02
[52] U.S. Cl. .................. 364/158; 364/157; 364/149
[58] Field of Search .................. 364/148–151, 364/157, 158, 161–163, 567, 165, 164; 318/632

[56] References Cited

U.S. PATENT DOCUMENTS

| | | | |
|---|---|---|---|
| 4,698,745 | 10/1987 | Hiroi et al. | 364/149 |
| 4,775,949 | 10/1988 | Kalata | 364/567 |
| 4,791,548 | 12/1988 | Yohikawa et al. | 364/149 |
| 4,882,526 | 11/1989 | Iino et al. | 364/158 |
| 5,043,863 | 8/1991 | Bristol et al. | 364/165 |
| 5,132,897 | 7/1992 | Allenberg | 364/149 |
| 5,245,529 | 9/1993 | Hiroi | 364/161 |
| 5,274,314 | 12/1993 | Maqueira | 318/632 |

FOREIGN PATENT DOCUMENTS

535306 2/1993 Japan .
5100714 4/1993 Japan .

Primary Examiner—James P. Trammell
Attorney, Agent, or Firm—Oblon, Spivak, McClelland, Maier & Neustadt

[57] ABSTRACT

A method of controlling a process having a control loop using feedback control, including inputting a set point for controlling the process and a controlled variable from the process to calculate a deviation between the set point and the controlled variable, performing one of PI and PID adjustment calculation to make the set point coincide with the controlled variable from the process to output a velocity-type adjustment calculating signal as a manipulated signal to the process, inputting the manipulated signal and outputting a first approximation signal in accordance with a characteristic of an approximated control system, receiving a disturbance signal to be added to the process and outputting a second approximation signal approximated to disturbance characteristic, adding the second approximation signal and the velocity-type adjustment calculation signal and outputting the result, calculating a gain correction ratio signal in accordance with a change in gain of the controller system and a change in disturbance obtained upon a predetermined adjustment, on the basis of the addition result and the first approximation signal, and multiplying the gain correction ratio signal by the controlled variable to perform gain correction of the control loop, and an apparatus implementing the method.

16 Claims, 6 Drawing Sheets

METHOD AND APPARATUS FOR CONTROLLING A PROCESS HAVING A CONTROL LOOP USING FEEDBACK CONTROL

BACKGROUND OF THE INVENTION

1. Field of the Invention

The present invention relates to a method of controlling a PI (P: proportional, I: integral) or PID (D: derivative) action used in various process instrument control systems and an apparatus thereof and, more particularly, to a method of controlling a process and an apparatus thereof including a technical means for correcting the gain of a control loop in accordance with a change in gain of a control target and a change in disturbance.

2. Description of the Related Art

The basic equation of PI control according to process control is represented by equation (1):

$$MV = K_c = (e + 1/T_I \int e \, dt) + MV_0 \quad (1)$$

where MV: control signal, $MV_0$: initial operation signal, e: deviation, $K_c$: proportional gain of controller, and $T_I$: integral time.

When equation (1) is represented by a transfer function, equation (2) is obtained:

$$C(s) = MV(s)/E + K_c\{1 + (T_I \cdot s)\} \quad (2)$$

where C(s): transfer function of PI control, s: Laplace operator. When the transfer function in equation (2) is represented by a velocity-type algorithm, equation (3) is obtained:

$$MV_n = MV_{n-1} + \Delta MV_n \quad (3)$$

$$\Delta MV_n = K_c\{(e_n - e_{n-1}) + (\Delta t/T_I)e_n\} \quad (4)$$

where $\Delta t$: control period, $e_n$: current deviation signal, $e_{n-1}$: previous deviation signal, $MV_n$: current operation signal, $MV_{n-1}$: previous operation signal, and $\Delta MV_n$: change in current operation signal.

Figure 1:
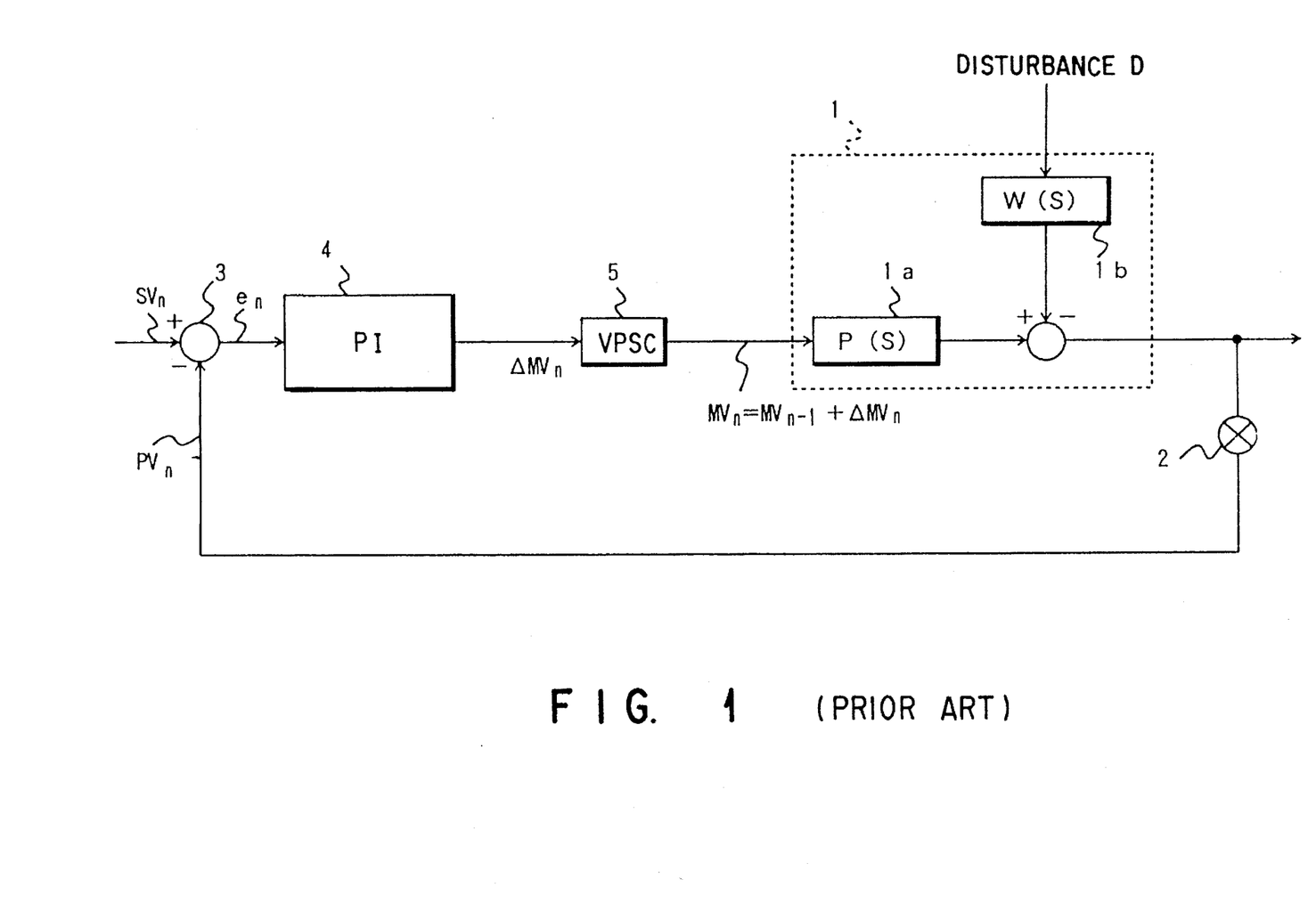
FIG. 1 is a view showing the arrangement of a conventional control apparatus.

FIG. 1 is a view showing the arrangement of a conventional PID control apparatus.

This PID control apparatus inputs a set point signal $SV_n$ and a controlled variable signal $PV_n$ detected from the output side of a controlled system 1a of a process 1 through a controlled variable detecting mean 2 to a deviation calculating mean 3. The deviation calculating mean 3 calculates a deviation signal:

$$e_n = SV_n - PV_n$$

to output the deviation signal to a velocity-type PI adjustment calculating mean 4. The velocity-type PI adjustment calculating mean 4 performs velocity-type PI adjustment calculation represented by equation (4) to calculate a change $\Delta MV_n$ in current operation signal to output the change $\Delta MV_n$ to a velocity-type to positional signal converting mean 5. The velocity-type to positional signal converting mean 5 extracts a positional manipulated signal $MV_n$ to output it to the process 1, and controls the controlled system 1a of the process 1 such that the deviation signal $e_n = SV_n - PV_n = 0$ is established by the positional manipulated signal $MV_n$, i.e., set point signal $SV_n$ = controlled variable signal $PV_n$ is established.

Various disturbance signals D are added to the output side of the controlled system 1a through a disturbance transfer function 1b.

In the above control apparatus, during predetermined adjustment, e.g., in a temperature control apparatus in summer or winter, a PI parameter of the velocity-type PI adjustment calculating mean 4 is adjusted such that optimal control is performed depending on seasons, and the gain of a control loop is set to be an optimum value during the adjustment.

In the above control apparatus, when the controlled system 1a is kept in a predetermined adjusted characteristics, no problem is posed. However, in an actual plant, the gain of the controlled system 1a or the disturbance transfer function 1b is rarely constant, and a controlled system gain considerably changes depending on a change in operation point, a change in quality of a material or catalyst, a change in environmental condition, a change in load, and the like, thereby adversely affecting controllability.

In particular, in order to cope with an advanced, flexible plant operation, the above problems must be solved.

SUMMARY OF THE INVENTION

It is an object of the present invention to provide a method of controlling a process to automatically perform gain correction such that the gain of a control loop is always kept constant and to continuously assure controllability in predetermined adjustment even when process characteristics change, and an apparatus thereof.

A method of controlling a process, which has a control loop using feedback control, according to the first aspect of the present invention is characterized by comprising the steps of: inputting a set point for controlling the process and a controlled variable from the process to calculate a deviation between the set point and the controlled variable; performing any one of PI (P: proportional, I: integral) adjustment calculation and PID (D: derivative) adjustment calculation to make the set point coincide with the controlled variable from the process to output a velocity-type adjustment calculating signal; outputting an output of the adjustment calculation as an manipulated signal to the process; inputting the manipulated signal to output a first approximation signal in accordance with a characteristics of an approximated controlled system; receiving a disturbance signal to be added to the process to output a second approximation signal approximated to disturbance characteristics; adding the second approximation signal and the controlled variable to output a sum; calculating a gain correction ratio signal in accordance with a change in gain of the controlled system and a change in disturbance obtained upon the predetermined adjustment, on the basis of the addition signal and the first approximation signal; and multiplying the gain correction ratio signal by the velocity-type adjustment calculating signal to perform gain correction of the control loop.

An apparatus for controlling a process, which has a control loop using feedback control, according to the first aspect of the present invention is characterized by comprising: deviation calculating means for inputting a set point for controlling the process and a controlled variable from the process to calculate a deviation between the set point and the controlled variable; adjustment calculating means for performing any one of PI (P: proportional, I: integral) adjustment calculation and PID (D: derivative) adjustment calculation to make the set point coincide with the controlled variable from the process to output a velocity-type adjustment calculating signal; means for outputting an output of the adjustment calculation as an manipulated signal to the process; controlled system model means for inputting the manipulated signal to output a signal in accordance with a characteristics of an approximated controlled system; disturbance model means for receiving a disturbance signal to be added to the process to output a signal approximated to disturbance characteristics; adding means for adding an output from the controlled system model means, the controlled variable, and an output from the disturbance model means; gain correction ratio calculating means for calculating a gain correction ratio signal in accordance with a change in gain of the controlled system and a change in disturbance obtained upon the predetermined adjustment, on the basis of an addition signal obtained by the adding means and the output from the controlled system model means; and gain correcting means for multiplying the gain correction ratio signal by the velocity-type adjustment calculating signal to perform gain correction of the control loop.

In the method and apparatus of the first aspect of the present invention, a gain correction ratio is almost 1 in predetermined adjustment. Thereafter, when the gain of a controlled system changes due to various conditions and an environment, a gain correction ratio signal related to the entire control loop including a change in gain of the controlled system and a change in disturbance is calculated, and then the gain correction ratio signal is multiplied by a velocity-type adjustment calculating signal from a velocity-type PI adjustment calculating mean to perform gain correction for the control loop. Therefore, in the method of controlling a process and the apparatus thereof according to the first aspect of the present invention, gain correction can be automatically performed regardless of the magnitudes of the change in gain of the controlled system and the change in disturbance such that the gain of the control loop is always kept constant, and controllability in the predetermined adjustment can be continuously assured even when process characteristics change.

A method of controlling a process according to the second aspect of the present invention is obtained such that the step of obtaining a feed forward control signal for predicting an influence of the disturbance signal and suppressing the influence of the disturbance signal in advance; and the step of adding the feed forward control signal to a gain-corrected positional conversion manipulated signal are added to the constituent steps of the method of controlling a process according to the first aspect of the present invention.

An apparatus for controlling a process according to the second aspect of the present invention is obtained such that feed forward control model means for obtaining a feed forward control signal for predicting an influence of the disturbance signal and suppressing the influence of the disturbance signal in advance; and adding means for adding the feed forward control signal from the feed forward control model means to a gain-corrected positional conversion manipulated signal having a corrected gain are added to the constituent elements of the apparatus for controlling a process according to the first aspect of the present invention.

The method and apparatus of the second aspect of the present invention have the same function as that of the method and apparatus of the first aspect of the present invention. In addition, according to the method and apparatus of the second aspect, an FF control model means is provided for obtaining a feed forward control signal for predicting the influence of a disturbance signal and suppressing the influence of the disturbance signal in advance, thereby quickly improving response characteristics.

A method of controlling a process according to the third aspect of the present invention is obtained such that the step of calculating a change in disturbance in accordance with a magnitude of the disturbance signal obtained upon the predetermined adjustment and multiplying the change in disturbance by the velocity-type adjustment calculating signal to perform gain correction on the basis of disturbance is added to the constituent steps of the method of controlling a process according to the second aspect of the present invention.

An apparatus for controlling a process according to the third aspect of the present invention is obtained such that disturbance gain correcting means for calculating a change in disturbance in accordance with a magnitude of the disturbance signal obtained upon predetermined adjustment and multiplying the change in disturbance by the velocity-type adjustment calculating signal from the adjustment calculating means to perform gain correction on the basis of disturbance is added to the constituent elements of the apparatus for controlling a process according to the second aspect of the present invention.

The method and apparatus of the third aspect of the present invention have the same functions as those of the methods and apparatuses of the first and second aspects of the present invention. In addition, according to the method and apparatus of the third aspect of the present invention, since a gain is corrected by a change in disturbance in accordance with the magnitude of a disturbance signal obtained after predetermined adjustment is performed, the influence of the change in gain of the control loop based on the magnitude of the change in disturbance can be corrected.

A method of controlling a process according to the fourth aspect of the present invention is obtained such that the step of converting the feed forward control signal to a velocity-type signal; and the step of adding the velocity-type signal to the velocity-type adjustment calculating signal obtained after gain correction based on disturbance is performed are added to the constituent steps of the method of controlling a process according to the third aspect of the present invention.

An apparatus for controlling a process according to the fourth aspect of the present invention is obtained such that difference calculating means for converting the feed forward control signal to a velocity-type signal; and disturbance compensation control means for adding the velocity-type signal to the velocity-type adjustment calculating signal obtained after gain correction based on disturbance is performed are added to the constituent elements of the apparatus for controlling a process according to the third aspect of the present invention.

The method and apparatus of the fourth aspect of the present invention have the same functions as those of the methods and apparatuses of the first to third aspects of the present invention. In addition, according to the method and apparatus of the fourth aspect, there are provided a gain scheduling function using FF control and the magnitude of disturbance, and a function of performing gain correction for a change in disturbance and changes in gain of the controlled systems of FF control and FB control. For this reason, a mixed process in which the gain of a controlled system changes can be controlled while the gain of the control loop is kept constant.

A method of controlling a process according to the fifth aspect of the present invention is obtained such that the step of smoothing the gain correction ratio signal in accordance with the change in gain of the controlled system and the change in disturbance to suppress an unnecessary variation; and the step of constraining a range in which the smoothed gain correction ratio signal changes are added to the method of controlling a process according to any one of the first to fourth aspects of the present invention.

An apparatus for controlling a process according to the fifth aspect of the present invention is obtained such that filter means for smoothing the gain correction ratio signal in accordance with the change in gain of the controlled system and the change in disturbance to suppress an unnecessary variation; and upper and lower limit constraining means for constraining a range in which the smoothed gain correction ratio signal from the filter means changes are added to the apparatus for controlling a process according to any one of the first to fourth aspects of the present invention.

In the method and apparatus of the fifth aspect of the present invention, a gain correction ratio signal is smoothed to suppress an unnecessary variation, thereby stabilizing a gain correction function, and a range of changes in smoothed gain correction ratio signal changes is constrained to reliably prevent overrun of a control loop.

As described above according to the present invention, gain correction can be automatically performed such that the gain of a control loop is always kept constant in accordance with a change in gain of a controlled system or a change in disturbance, and control having high controllability can be realized. Therefore, even when process characteristics change upon predetermined adjustment, a stable operation can be continuously assured without degrading controllability. As a result, the present invention can properly cope with a flexible plant operation, an unmanned plant operation, an advanced plant operation, and the like. The controllability of the entire plant can be innovated, thereby making contribution to the industrial field.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Embodiments of the present invention will be described below with reference to the accompanying drawings.

A process control apparatus according to the first embodiment of the present invention will be described below with reference to FIG. 2. The same reference numerals as in FIG. 1 denote the same parts in FIG. 2, and a description thereof will be omitted.

Different parts between the conventional apparatus shown in FIG. 1 and the apparatus according to the first embodiment of the present invention will be described below.

A process control apparatus according to the present invention is constituted by adding a controlled system model mean 11, a gain correction ratio calculating mean 12, a disturbance detecting mean 13, a disturbance model mean 14, a first adder 15, and a gain correction mean 16 to the conventional apparatus shown in FIG. 1.

The controlled system model mean 11 is arranged on the output side of a velocity-type to positional signal converting mean 5, and is a model obtained by approximating control target characteristics in predetermined adjustment. The controlled system model mean 11 receives a positional manipulated signal $MV_n$ output from the velocity-type to positional signal converting mean 5 to output a controlled system characteristic value $PV_{Mn}$ obtained when a controlled system 1a is defined as a fixed model and to supply the controlled system characteristic value $PV_{Mn}$ to the gain correction ratio calculating mean 12 (to be described later).

The disturbance detecting mean 13 detects a disturbance signal D to output a disturbance detecting signal $d_n$.

The disturbance model mean 14 is a model obtained by approximating influence characteristics of disturbance to output a disturbance characteristic value $PV_{wMn}$ on the basis of the disturbance detecting signal $d_n$ output from the disturbance detecting mean 13.

The first adder 15 adds and synthesizes the disturbance characteristic value $PV_{wMn}$ output from the disturbance model mean 14 and the controlled variable signal $PV_n$ output from a controlled variable detecting mean 2 to calculate and output an added, synthesized value ($PV_n + PV_{wMn}$).

The gain correction ratio calculating mean 12 divides the controlled system characteristic value $PV_{Mn}$ output from the controlled system model mean 11 by the added, synthesized value ($PV_n + PV_{wMn}$) output from the first adder 15 to calculate and output a gain correction ratio signal $K_n$.

The gain correction mean 16 multiplies a velocity-type output signal $\Delta MV_n$ serving as an adjusted, calculated output obtained by a velocity-type PI adjustment calculating mean 4 and the gain correction ratio signal $K_n$ output from the gain correction ratio calculating mean 12 to output the resultant value to the velocity-type to positional signal converting mean 5.

With the above arrangement, the process control apparatus according to the present invention has a function of performing automatic correction such that the gain of a control loop (i.e., the controlled system 1a) is always kept constant even when the gain of the controlled system changes.

The operations of the process control apparatus according to the present invention will be described below in comparison with the conventional apparatus.

In the control loop of a general process, when the gain of the controlled system 1a changes, the gain of the control loop changes, thereby considerably degrading controllability.

The process control apparatus according to the present invention aims at accurately grasping a change in gain of the controlled system $1a$ from a change in characteristics of an entire process including the controlled system and disturbance and automatically and easily correcting the gain of the controlled system $1a$ not to change the gain of the control loop.

In the process control apparatus according to the first embodiment of the present invention, when the process 1 keeps a gain obtained in predetermined adjustment, the process 1, the controlled system model mean 11, and the disturbance model mean 14 coincide with each other. At this time, the output $PV_{Mn}$ from the controlled system model mean 11 must coincide with the added, synthesized value (i.e., the output from the first adder 15) obtained by adding and synthesizing the controlled variable $PV_n$ from the process 1 and the output $PV_{WMn}$ from the disturbance model mean 14. According to this condition, the gain correction ratio signal $K_n$ obtained by equation (5):

$$K_n = PV_{Mn}/(PV_n + PV_{WMn}) \quad (5)$$

must be 1 (i.e., $K_n = 1$).

However, in the actual process 1, even when a control constant is adjusted to establish $K_n = 1$, process characteristics largely change in accordance with an operation point, quality of a material or catalyst, an environment, a load state, and the like upon adjustment, and $K_n = 1$ is not established.

The process control apparatus according to the present invention extracts disturbance signal when target process characteristics change and accurately calculates the gain correction ratio signal $K_n$ to perform gain correction.

A method of automatically correcting the gain of a control loop in accordance with a change in gain of a controlled system in the process control apparatus according to the present invention will be described state below. The process control apparatus according to the present invention is an extremely basic control apparatus applied to control of a non-mixed process for controlling general quantitative balances such as a pressure, a flow rate, a level, and the like.

As is apparent from FIG. 1, the controlled variable value $PV_n$ of the process 1 in the prior art can be represented by the following equation (6):

$$PV_n = \{(C(s) \cdot P(s))/(1+C(s) \cdot P(s))\} \cdot SV_n + \{W(s)/(1+C(s) \cdot P(s))\} \cdot D_n \quad (6)$$

where C(s): transfer function of control system, P(s): transfer function of controlled system $1a$, and W(s): transfer function of disturbance D.

In consideration of a gain, when the gain of $C(s) \cdot P(s)$ is constant, it is found that controllability is kept unchanged. Since a gain $K_c$ of the transfer function C(s) of this control system has a value obtained when a control constant is adjusted, the gain $K_c$ is constant. Therefore, when the gain of the controlled system $1a$ changes, if the change in gain is corrected not to change the gain, controllability does not change.

In the process control apparatus according to the present invention, a correction coefficient of the transfer function P(s) of the controlled system with respect to a change in gain is calculated as follows.

The controlled variable $PV_n$ of the process 1 and the output $PV_{Mn}$ from the controlled system model mean 11 with respect to an manipulated signal $MV_n$ are calculated by the following equations:

$$PV_n = MV_n \cdot \{Kp/(1+Tp \cdot s)\} \cdot exp(-Lp \cdot s) - W(s) \times D_n \approx MV_n \times \{Kp/(1+Tp \cdot s)\} \cdot exp(-Lp \cdot s) - PV_{WMn} \quad (7)$$

$$PV_{Mn} = MV_n \cdot \{K_M/(1+T_M \cdot s)\} \cdot exp(-L_M \cdot s) \quad (8)$$

where Lp: dead time of controlled system, Kp: controlled system gain, Tp: time constant of controlled system, $L_M$: dead time of controlled system, $K_M$: gain of controlled system model, $T_M$: time constant of controlled system model, s: Laplacean operator, $MV_n$: manipulated signal, $PV_n$: controlled variable signal, $PV_{Mn}$: output signal from controlled system model mean, and $PV_{WMn}$: output signal from disturbance model mean.

Equations (7) and (8) are rewritten to calculate a ratio $K_n$ of equation (7) to equation (8):

$$K_n = (K_M/Kp)\{(1+Tp \cdot s)/(1+T_M \cdot s)\} \cdot exp(-(L_M - Lp)) \cdot s \quad (9)$$

In this case, if $T_M \approx Tp$ and $L_M \approx Lp$, the following equation can be obtained from equation (9):

$$K_n \approx K_M/Kp = PV_{Mn}/(PV_n + PV_{WMn}) \quad (10)$$

When the open loop gain of the control loop obtained in the prior art in FIG. 1 is represented by A, $$A = \text{gain } (K_c) \text{ of adjustment calculating mean} \times \text{controlled system gain } (Kp) = K_c \times Kp \quad (11)$$

When the controlled system gain Kp changes, the open loop gain A changes, thereby degrading controllability.

Figure 2:
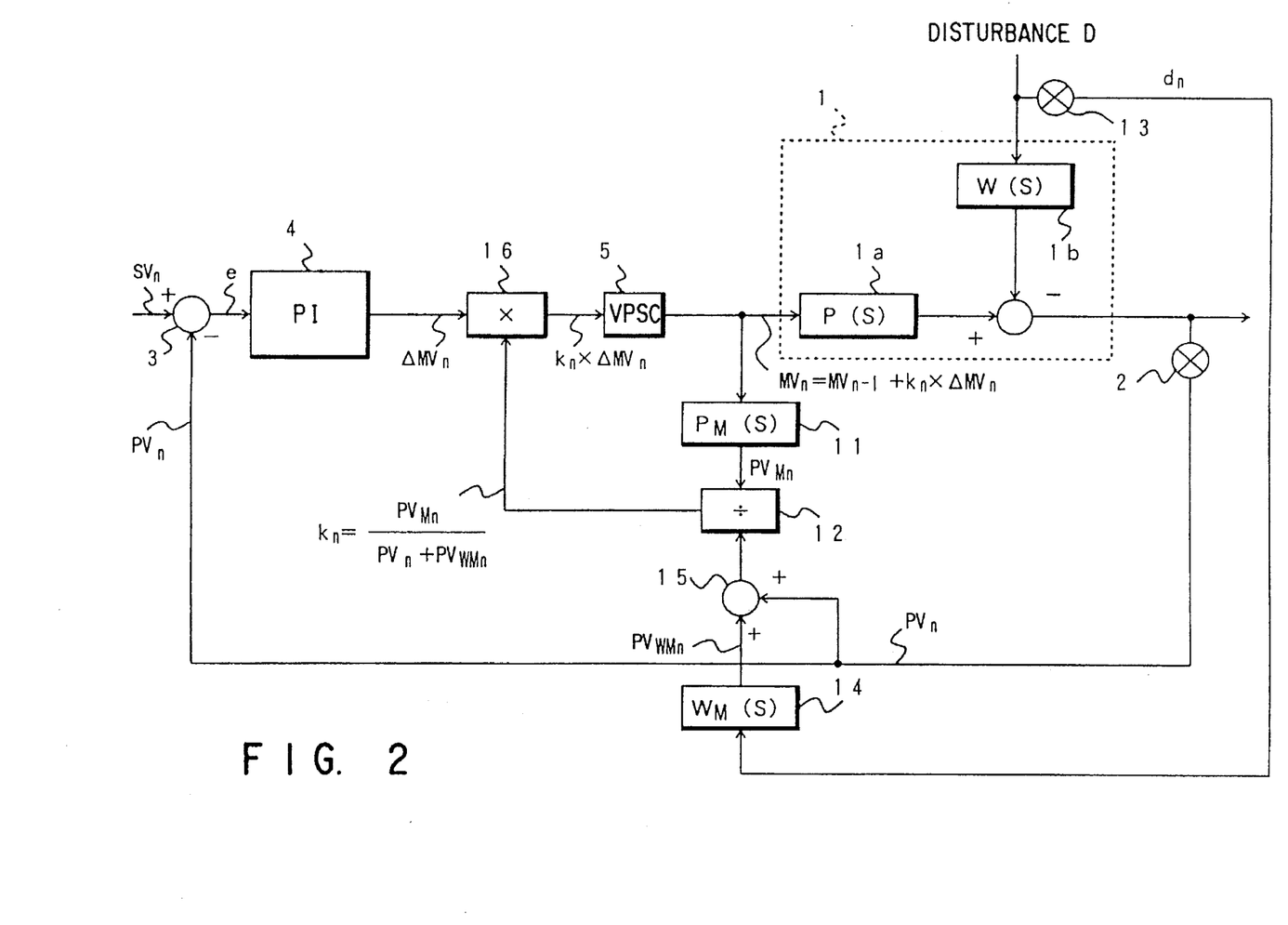
FIG. 2 is a schematic view showing the arrangement of a process control apparatus according to the first embodiment of the present invention.

In the process control apparatus according to the present invention shown in FIG. 2, when the open loop gain of the control loop is represented by B, $$\begin{aligned} B &= \text{gain } (K_c) \text{ of adjustment calculating mean} \times K_n \times \text{controlled system gain } K_P \quad (12) \\ &= K_c \times (K_M/K_P) \times K_P \\ &= K_c \times K_M \end{aligned}$$

Even when the controlled system gain Kp changes, the open loop gain B does not change, thereby preventing degradation of controllability.

As described above, according to the present invention, gain correction is automatically performed such that the gain of the control loop is always kept constant regardless of a change in gain of the controlled system and a change in disturbance, and, even when process characteristics change, controllability in predetermined adjustment can be continuously assured.

A process control apparatus according to the second embodiment of the present invention will be described below with reference to FIG. 3.

The process control apparatus according to the second embodiment of the present invention is obtained by adding an FF control model mean 21 and a second adder 22 to the arrangement of the process control apparatus shown in FIG. 2.

The FF control model mean 21 predicts the influence of a disturbance signal D on the basis of a disturbance detecting signal $d_n$ from a disturbance detecting mean 13 to obtain a feed forward control signal $FF_n$ for suppressing the influence of the disturbance signal D in advance (i.e., feed forward control to be referred to as "FF control" hereinafter).

The second adder 22 adds the feed forward control signal $FF_n$ obtained by the FF control model mean 21 to a positional manipulated signal $MV_n$ obtained by converting a gain-corrected velocity-type signal by a velocity-type to positional signal converting mean 5, thereby compensating the influence of the disturbance.

According to the process control apparatus of the second embodiment, when disturbance changes, the disturbance is quickly suppressed by the FF control model mean 21 and the second adder 22 to improve controllability. In addition, in the process control apparatus according to the second embodiment, as in the apparatus of the first embodiment shown in FIG. 2, the gain of the control loop can be automatically corrected with respect to a change in gain of the controlled system on the basis of a change in characteristics of the entire process including the control target and the disturbance. For this reason, the control loop can be stabilized.

Therefore, the process control apparatus according to the second embodiment is very effectively applied to a nonmixed process like the process control apparatus according to the first embodiment.

A process control apparatus according to the third embodiment of the present invention will be described below with reference to FIG. 4.

Figure 3:
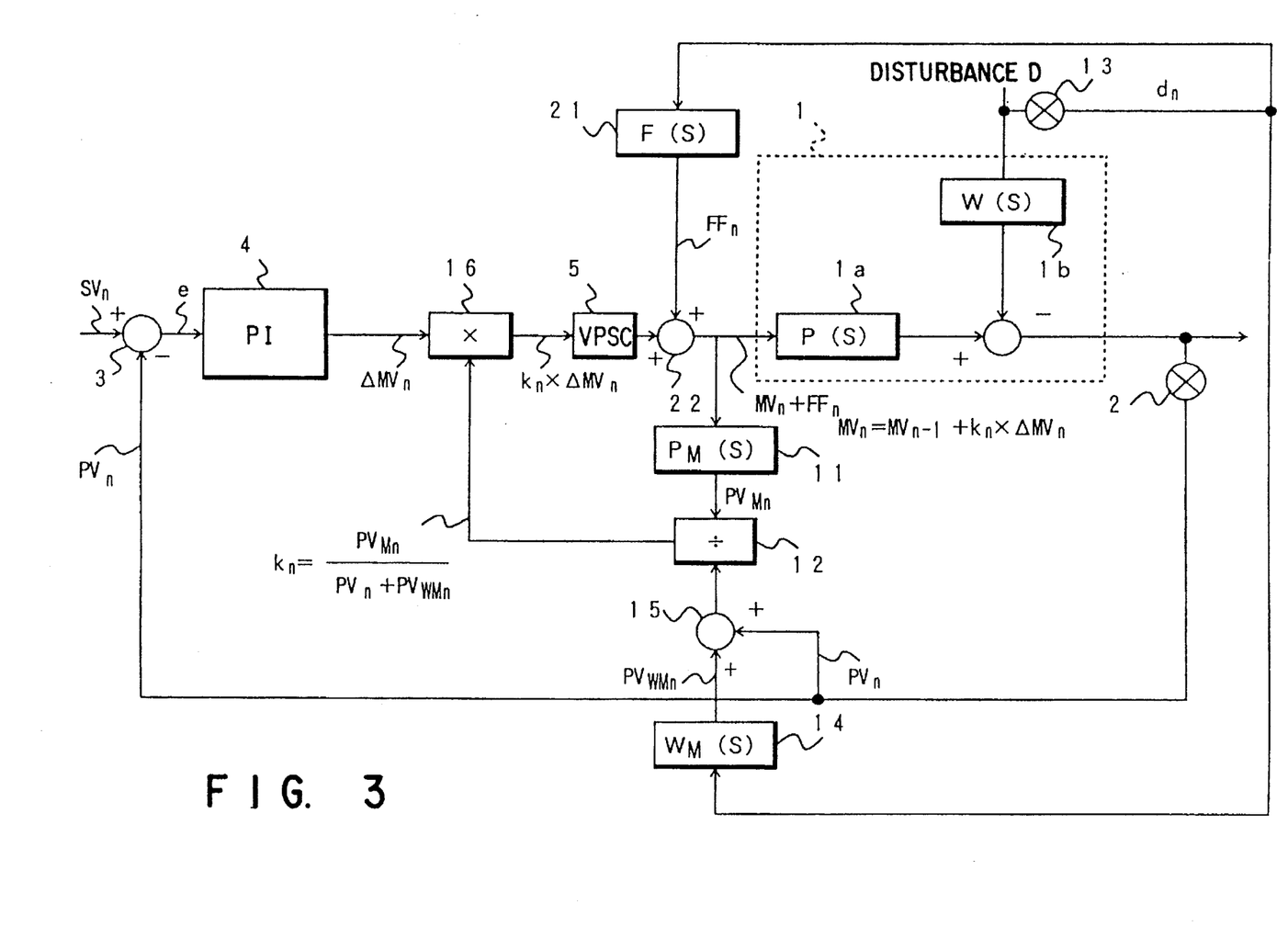
FIG. 3 is a schematic view showing the arrangement of a process control apparatus according to the second embodiment of the present invention.

The process control apparatus according to the third embodiment is obtained by adding a disturbance change detecting mean 31 and a disturbance correction mean 32 to the arrangement of the process control apparatus according to the second embodiment shown in FIG. 3.

The disturbance change detecting mean 31 calculates a change in disturbance in accordance with the magnitude of a disturbance signal obtained after predetermined adjustment is performed.

The disturbance correction mean 32 multiplies a change $K_{Fn} = d_n/d_0$ ($d_0$: magnitude of disturbance obtained in predetermined adjustment, $d_n$: disturbance detecting signal) in disturbance from the disturbance change detecting mean 31 by a velocity-type adjustment calculating signal from a velocity-type PI adjustment calculating mean 4 to perform gain correction by disturbance D.

According to the process control apparatus of the third embodiment, the disturbance detecting signal $d_n$ detected by a disturbance detecting mean 13 is output to the disturbance change detecting mean 31. When a control constant or the like is to be adjusted, a ratio $K_{Fn}$ is set such that almost "1" is output from the disturbance change detecting mean 31. For this reason, when the disturbance detecting signal $d_n$ changes after the control constant is adjusted, the disturbance change detecting mean 31 calculates the following equation:

$$K_{Fn} = d_n/d_0$$

to obtain a disturbance change signal in accordance with the magnitude of disturbance. The disturbance correction mean 32 multiplies this disturbance change signal by the velocity-type adjustment calculating signal from the velocity-type PI adjustment calculating mean 4 to automatically correct the gain of the control loop in accordance with the magnitude of disturbance. The disturbance correction mean 32 operates to keep the gain of the control loop constant.

Since the process control apparatus according to the third embodiment has the FF control model mean 21 and the second adder 22 described in the second embodiment, disturbance can be quickly suppressed with a change in disturbance, thereby improving controllability. In addition, in the process control apparatus according to the third embodiment, as in the apparatus according to the first embodiment, the gain of the control loop is automatically corrected with respect to a change in gain of the controlled system on the basis of a change in characteristics of the entire process including the controlled system and the disturbance. For this reason, the control loop can be stably controlled.

Therefore, the process control apparatus according to the third embodiment can be very effectively applied to a mixed process in which the gain of the controlled system changes in accordance with the magnitude of disturbance such as a load. The process control apparatus according to the third embodiment has an arrangement obtained by adding the FF control and the gain scheduling function performed by the magnitude of disturbance of the second embodiment to the process control apparatus according to the first embodiment.

Figure 5:
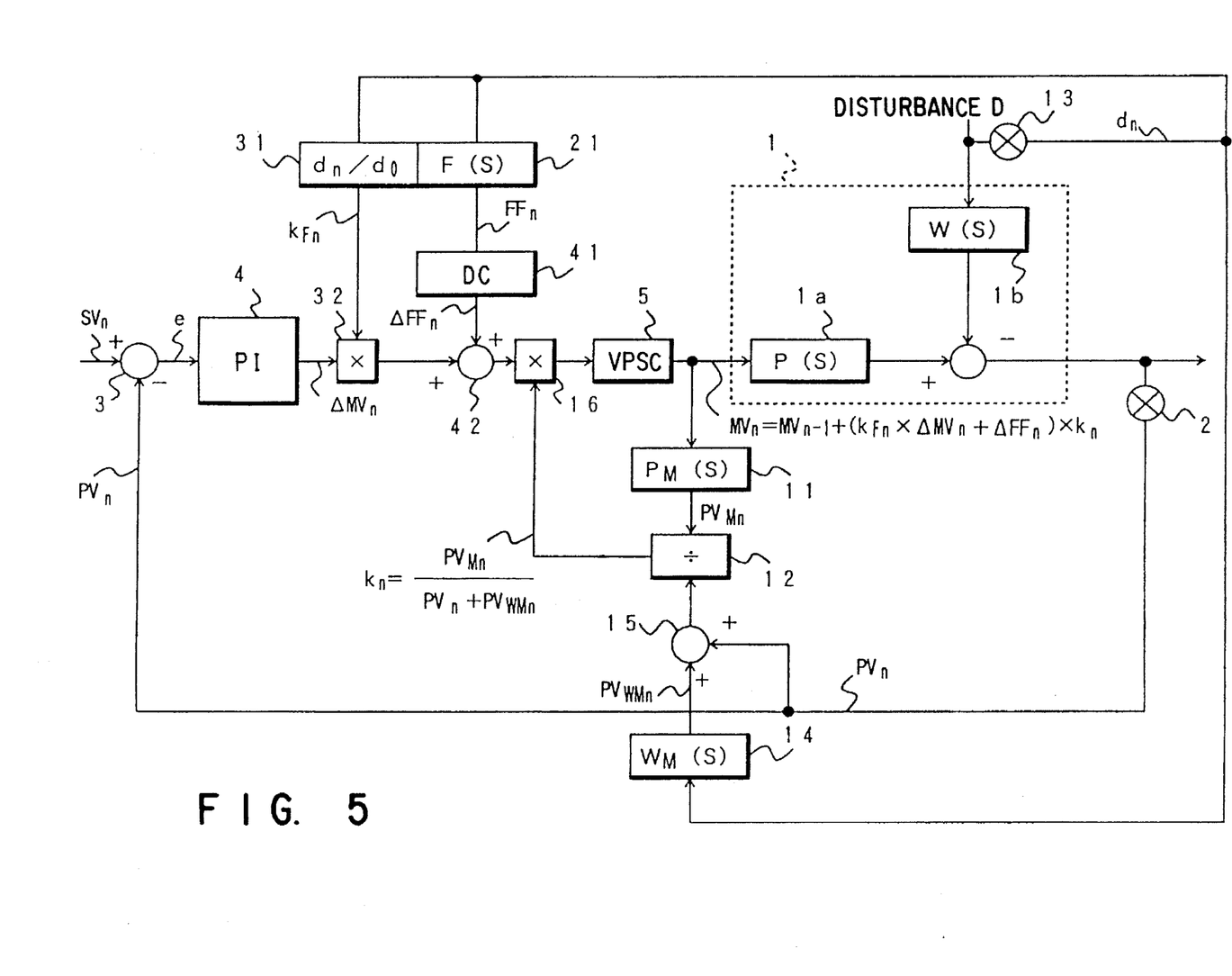
FIG. 5 is a schematic view showing the arrangement of a process control apparatus according to the fourth embodiment of the present invention.

A process control apparatus according to the fourth embodiment of the present invention will be described below with reference to FIG. 5.

Figure 4:
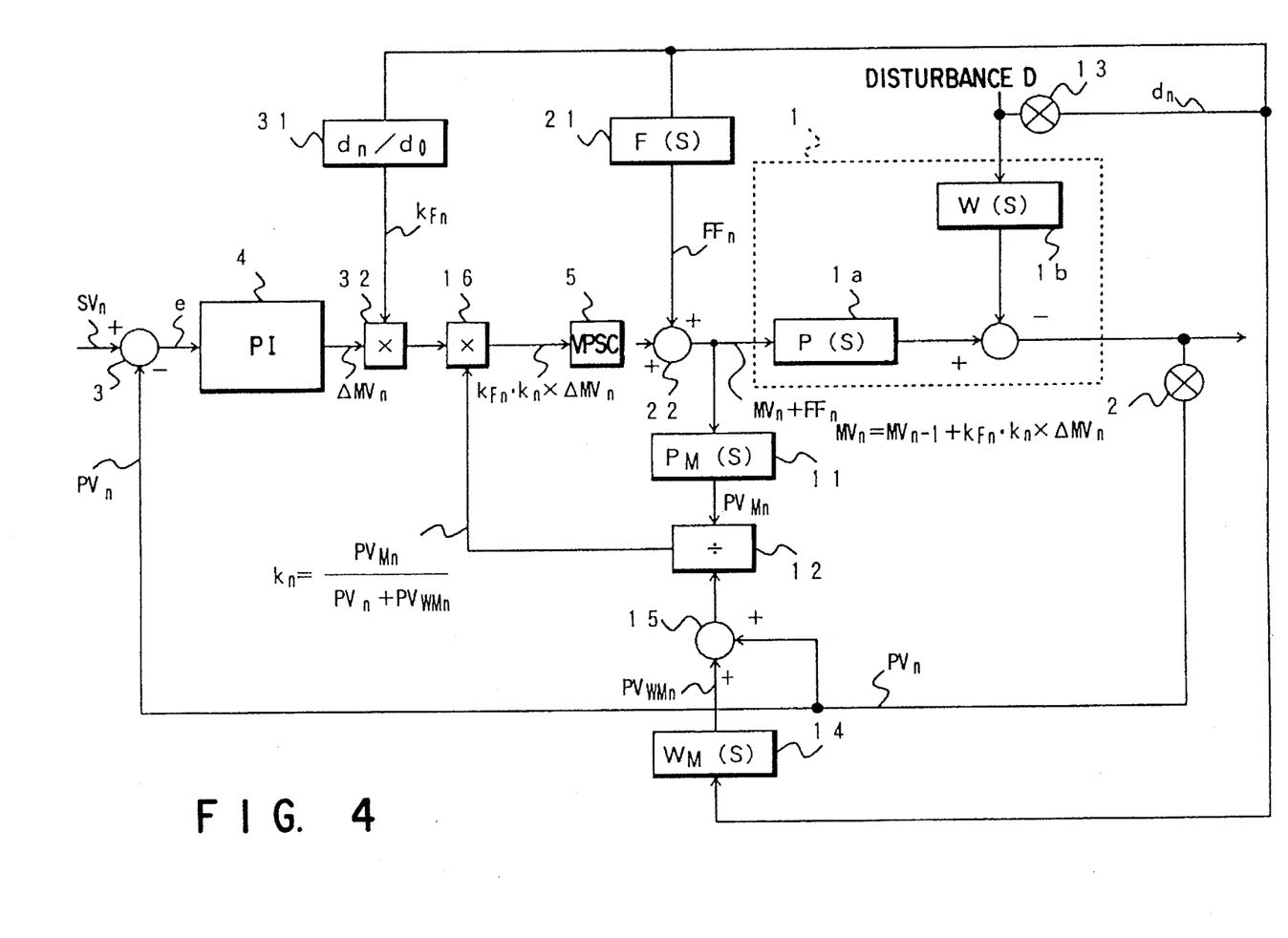
FIG. 4 is a schematic view showing the arrangement of a process control apparatus according to the third embodiment of the present invention.

The process control apparatus according to the fourth embodiment is obtained by adding a difference calculating mean 41 and a third adder 42 to the arrangement of the process control apparatus according to the third embodiment shown in FIG. 4.

The difference calculating mean 41 is arranged on the output side of an FF control model mean 21 and performs a difference calculation (to be described later).

The third adder 42 adds an output from the difference calculating mean 41 to a velocity-type adjustment calculating signal gain-corrected by disturbance.

A positional output signal $FF_n$ from the FF control model mean 21 is input to the difference calculating mean 41. The difference calculating mean 41 performs difference calculation (shown in equation (13)) in which a previous output $FF_{n-1}$ is subtracted from a current output $FF_n$ to convert the positional signal into a velocity-type signal $\Delta FF_n$.

$$\Delta FF_n = FF_n - FF_{n-1} \quad (13)$$

The third adder 42 adds and synthesizes the converted velocity-type signal $\Delta FF_n$ to $K_{Fn} \times \Delta MV_n$ obtained by performing gain scheduling caused by disturbance for a velocity-type adjustment calculating signal $\Delta MV_n$ of feedback control (to be referred to as "FB control" hereinafter) to output the resultant value to a gain correction mean 16. In the fourth embodiment, as in the first embodiment, the gain correction mean 16 automatically corrects a gain.

The process control apparatus according to the fourth embodiment can be effectively applied to a mixed process in which the gain of a controlled system changes depending on the magnitude of disturbance such as a load. The FF control of the second embodiment and the gain scheduling function performed by the magnitude of disturbance in the third embodiment are added to the apparatus of the first embodiment, and the FF and FB control values are multiplied by a gain correction ratio to a change in gain of the controlled system.

Figure 6:
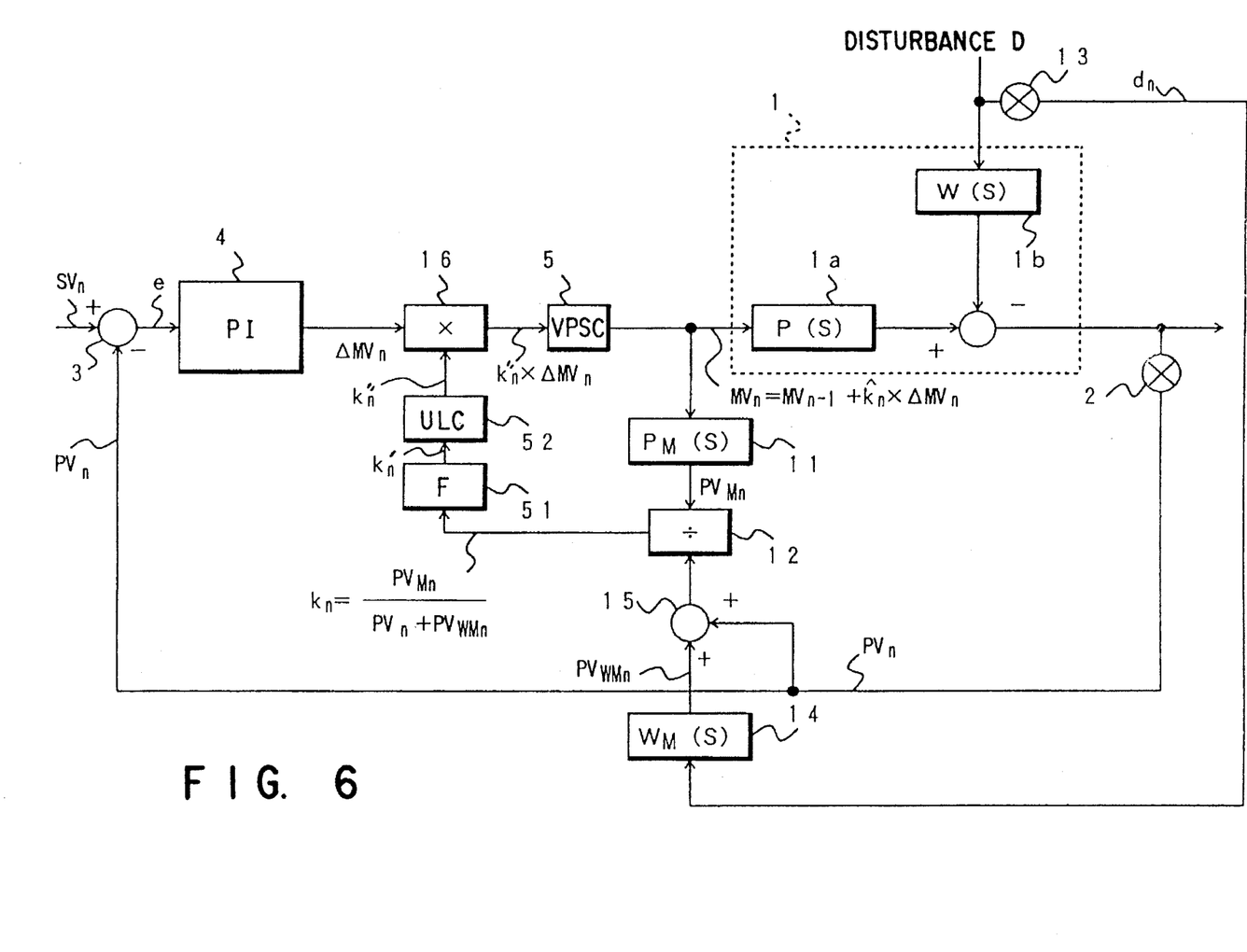
FIG. 6 is a schematic view showing the arrangement of a process control apparatus according to the fifth embodiment of the present invention.

A process control apparatus according to the fifth embodiment of the present invention will be described below with reference to FIG. 6.

The process control apparatus according to the fifth embodiment is obtained by adding a filter mean 51 and an upper and lower limit constraint mean 52 to the process control apparatus of the first embodiment shown in FIG. 2. The filter mean 51 and the upper and lower limit constraint mean 52 can be applied to the process control apparatuses according to the second to fourth embodiments.

When a gain correction ratio signal $K_n$ obtained by a gain correction ratio calculating mean 12 frequently or abruptly changes, problems are posed in process control. For this reason, the gain correction ratio signal $K_n$ is smoothed by the filter mean 51 to absorb an abrupt change, thereby outputting a gain correction ratio signal $K_{n'}$ having a moderate change. The gain correction ratio signal $K_{n'}$ input to the upper and lower limit constraint mean 52 is constrained with levels corresponding the upper and lower limits of a normal operation range by the upper and lower limit constraint mean 52 to obtain a gain correction ratio signal $K_{n'''}$ for prevent overrun of a control loop. The upper and lower limit constraint mean 52 outputs the gain correction ratio signal $K_{n'''}$ to a gain correction mean 16. The gain correction mean 16 multiplies the gain correction ratio signal $K_{n'''}$ by an output signal $\Delta MV_n$ from a velocity-type PI adjustment calculating mean 4 to automatically correct the gain.

Therefore, in the process control apparatus according to the fifth embodiment, a gain correcting function can be stabilized, and overrun of the control loop can be prevented. In addition, when the apparatus of the fifth embodiment is combined with the apparatus according to the second to fourth embodiments, the effects obtained in the embodiments described above can also be obtained.

The present invention is not limited to the above embodiments, and various changes and modifications can be effected without departing from the spirit or scope of the invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of controlling a process having a control loop using feedback control, comprising the steps of:

inputting a set point for controlling the process and a controlled variable from the process to calculate a deviation between the set point and the controlled variable;

performing one of PI (P: proportional, I: integral) adjustment calculation and PID (D: derivative) adjustment calculation in order to make the controlled variable from the process coincide with the set point and outputting a velocity-type adjustment calculating signal as a manipulated signal to the process;

inputting the manipulated signal and outputting a first approximation signal in accordance with a characteristics of an approximated controlled system;

receiving a disturbance signal to be added to the process and outputting a second approximation signal approximated to disturbance characteristics;

adding the second approximation signal and the controlled variable and outputting a result of addition;

calculating a gain correction ratio signal in accordance with a change in gain of a controlled system and a change in disturbance obtained upon a predetermined adjustment, on the basis of the result of addition and the first approximation signal; and performing gain correction of the control loop by multiplying the gain correction ratio signal by the velocity-type adjustment calculating signal.

2. A method according to claim 1, further comprising the steps of:

smoothing the gain correction ratio signal in accordance with the change in gain of the controlled system and the change in disturbance to suppress an unnecessary variation; and constraining a range in which the smoothed gain correction ratio signal changes.

3. A method according to claim 1, further comprising the steps of:

obtaining a feed forward control signal for predicting an influence of the disturbance signal and suppressing the influence of the disturbance signal in advance; and adding the feed forward control signal to a gain-corrected positional conversion manipulated signal.

4. A method according to claim 3, further comprising the steps of:

smoothing the gain correction ratio signal in accordance with the change in gain of the controlled system and the change in disturbance to suppress an unnecessary variation; and constraining a range in which the smoothed gain correction ratio signal changes.

5. A method according to claim 3, further comprising the step of calculating a change in disturbance in accordance with a magnitude of the disturbance signal obtained upon the predetermined adjustment and multiplying the change in disturbance by the velocity-type adjustment calculating signal to perform gain correction on the basis of disturbance.

6. A method according to claim 5, further comprising the steps of:

smoothing the gain correction ratio signal in accordance with the change in gain of the controlled system and the change in disturbance to suppress an unnecessary variation; and constraining a range in which the smoothed gain correction ratio signal changes.

7. A method according to claim 5, further comprising the steps of:

converting the feed forward control signal to a velocity-type signal; and adding the velocity-type signal to the velocity-type adjustment calculating signal obtained after gain correction based on disturbance is performed.

8. A method according to claim 7, further comprising the steps of:

smoothing the gain correction ratio signal in accordance with the change in gain of the controlled system and the change in disturbance to suppress an unnecessary variation; and constraining a range in which the smoothed gain correction ratio signal changes.

9. An apparatus for controlling a process having a control loop using feedback control, comprising:

deviation calculating means for inputting a set point for controlling the process and a controlled variable from the process and for calculating a deviation between the set point and the controlled variable;

adjustment calculating means for performing one of PI (P: proportional, I: integral) adjustment calculation and PID (D: derivative) adjustment calculation to make the controlled variable from the process coincide with the set point and for outputting a velocity-type adjustment calculating signal as a manipulated signal to the process;

controlled system model means for inputting the manipulated signal and outputting a signal in accordance with a characteristics of an approximated controlled system;

disturbance model means for receiving a disturbance signal to be added to the process for outputting a signal approximated to disturbance characteristics;

adding means for adding the controlled variable output from said process and the signal output from said disturbance model means and outputting an addition signal;

gain correction ratio calculating means for calculating a gain correction ratio signal in accordance with a change in gain of a controlled system and a change in disturbance obtained upon a predetermined adjustment, on the basis of the addition signal output by said adding means and the output from said controlled system model means; and gain correcting means for performing gain correction of the control loop by multiplying the gain correction ratio signal by the velocity-type adjustment calculating signal.

10. An apparatus according to claim 9, further comprising:

filter means for smoothing the gain correction ratio signal in accordance with the change in gain of the controlled system and the change in disturbance to suppress an unnecessary variation; and upper and lower limit constraining means for constraining a range in which the smoothed gain correction ratio signal from said filter means changes.

11. An apparatus according to claim 9, further comprising:

feed forward control model means for obtaining a feed forward control signal for predicting an influence of the disturbance signal and suppressing the influence of the disturbance signal in advance; and adding means for adding the feed forward control signal from said feed forward control model means to a gain-corrected positional conversion manipulated signal having a corrected gain.

12. An apparatus according to claim 11, further comprising:

filter means for smoothing the gain correction ratio signal in accordance with the change in gain of the controlled system and the change in disturbance to suppress an unnecessary variation; and upper and lower limit constraining means for constraining a range in which the smoothed gain correction ratio signal from said filter means changes.

13. An apparatus according to claim 11, further comprising disturbance gain correcting means for calculating a change in disturbance in accordance with a magnitude of the disturbance signal obtained upon predetermined adjustment and multiplying the change in disturbance by the velocity-type adjustment calculating signal from said adjustment calculating means to perform gain correction on the basis of disturbance.

14. An apparatus according to claim 13, further comprising:

filter means for smoothing the gain correction ratio signal in accordance with the change in gain of the controlled system and the change in disturbance to suppress an unnecessary variation; and upper and lower limit constraining means for constraining a range in which the smoothed gain correction ratio signal from said filter means changes.

15. An apparatus according to claim 13, further comprising:

difference calculating means for converting the feed forward control signal to a velocity-type signal; and disturbance compensation control means for adding the velocity-type signal to the velocity-type adjustment calculating signal obtained after gain correction based on disturbance is performed.

16. An apparatus according to claim 15, further comprising:

filter means for smoothing the gain correction ratio signal in accordance with the change in gain of the controlled system and the change in disturbance to suppress an unnecessary variation; and upper and lower limit constraining means for constraining a range in which the smoothed gain correction ratio signal from said filter means changes.

* * * * *